US012518350B2

(12) United States Patent
Saheli et al.

(10) Patent No.: US 12,518,350 B2
(45) Date of Patent: Jan. 6, 2026

(54) METHOD FOR GENERATING A HIGH DYNAMIC RANGE IMAGE

(71) Applicant: Aptiv Technologies AG, Schaffhausen (CH)

(72) Inventors: Ali Saheli, Wuppertal (DE); Alexander Barth, Wermelskirchen (DE)

(73) Assignee: Aptiv Technologies AG, Schaffhausen (CH)

( * ) Notice: Subject to any disclaimer, the term of this patent is extended or adjusted under 35 U.S.C. 154(b) by 145 days.

(21) Appl. No.: 18/585,275

(22) Filed: Feb. 23, 2024

(65) Prior Publication Data
US 2024/0289925 A1    Aug. 29, 2024

(30) Foreign Application Priority Data

Feb. 23, 2023  (EP) ..................................... 23158216

(51) Int. Cl.
*G06T 5/50*        (2006.01)
*H04N 23/11*       (2023.01)
*H04N 23/73*       (2023.01)
*H04N 23/741*      (2023.01)

(52) U.S. Cl.
CPC ............... *G06T 5/50* (2013.01); *H04N 23/11* (2023.01); *H04N 23/73* (2023.01); *H04N 23/741* (2023.01); *G06T 2207/10048* (2013.01); *G06T 2207/10144* (2013.01); *G06T 2207/20208* (2013.01); *G06T 2207/20221* (2013.01)

(58) Field of Classification Search
None
See application file for complete search history.

(56) References Cited

U.S. PATENT DOCUMENTS

| 8,446,470 | B2 | 5/2013 | Lu |
| 9,437,171 | B2 | 9/2016 | Narasimha |
| 11,496,694 | B2 | 11/2022 | Peng |
| 2013/0258112 | A1 | 10/2013 | Baksht |

(Continued)

FOREIGN PATENT DOCUMENTS

KR    102570305 B1 *  8/2023  ........... H04N 25/583

OTHER PUBLICATIONS

English translation of KR-102570305-B1, 2023 (Year: 2023).*

(Continued)

*Primary Examiner* — James M Hannett
(74) *Attorney, Agent, or Firm* — Miller Johnson (57) ABSTRACT

A method includes obtaining a short exposure color-infrared (color-IR) image captured with an activated infrared (IR) illuminator and a long exposure color-IR image captured with a deactivated IR illuminator. The short exposure color-IR image is captured with a shorter exposure time than the long exposure color-IR image. The method includes determining an IR light impact of the of the short exposure color-IR image and of the long exposure color-IR image. The method includes mitigating the IR light impact in the short exposure color-IR image to obtain a short exposure IR-suppressed color image. The method includes mitigating the IR light impact in the long exposure color-IR image to obtain a long exposure IR-suppressed color image. The method includes merging the short exposure IR-suppressed color image with the long exposure IR-suppressed color image to obtain a merged HDR image.

18 Claims, 9 Drawing Sheets

(56) References Cited

U.S. PATENT DOCUMENTS

2020/0204721 A1* 6/2020 Douady ................ H04N 23/60
2022/0198604 A1   6/2022 Dabral
2022/0230455 A1   7/2022 Popovic
2022/0392182 A1  12/2022 Tu
2022/0414847 A1* 12/2022 Kwon ...................... G06T 5/50

OTHER PUBLICATIONS

Extended European Search Report for EP23158216.4, 9 pages Jul. 21, 2023.
Li et al., "Unconventional Visual Sensors for Autonomous Vehicles," arXiv:2205.09383, 20 pages May 19, 2022.

* cited by examiner

METHOD FOR GENERATING A HIGH DYNAMIC RANGE IMAGE

CROSS-REFERENCE TO RELATED APPLICATIONS

This application claims priority to EP 23 158 216 filed Feb. 23, 2023, the entire disclosure of which is incorporated by reference.

FIELD

The present disclosure relates to a computer-implemented method for generating a high dynamic range (HDR) image as well as to an apparatus and a computer program that are configured to perform the aforementioned method. In addition, the present disclosure relates to a vehicle comprising the aforementioned apparatus.

BACKGROUND

Nowadays, cabin sensing cameras used for tracking and monitoring cabins of vehicles (like cars, trucks etc.) typically use imagers that are able to record color images according to the red/green/blue (RGB) color space as well as infrared (IR) images. This may be achieved by using an RGB-IR color filter array (CFA). Hence, individual pixels may have different filters to capture different parts of the light spectrum. Native IR pixels are primarily sensitive to IR light, having a wavelength of around 940 nanometers (nm). Visible light pixels are primarily sensitive to the colors red, green, and blue. However, all visible light pixels are in addition sensitive to the IR light spectrum. Hence, the raw sensor information always contains both RGB and IR pixels and it depends on the further processing whether the image results in a color image or an IR image.

Typically, one has to decide in which mode an RGB-IR camera should operate at a time, or whether it should alternate between different modes. For example, such a camera could be configured to acquire only RGB or only IR images. In addition, the camera could be configured to acquire RGB and IR images in an alternating way, for example according to a sequence RGB-IR-RGB-IR-RGB-IR. In such an alternating mode, the RGB images are single exposure frames with limited dynamic range. Specifically in cabin sensing applications one has to find a quality tradeoff between parts of an image that show the cabin of the vehicle and parts that show the surrounding of the vehicle captured through the vehicle windows. If an RGB-IR camera is configured to provide the parts of an image that show a cabin and/or the passengers of a vehicle in good quality, the parts of the image that show the surrounding of the vehicle (e.g., visible through the windows of a vehicle) are oftentimes saturated due to much higher intensity of light, which is specifically true for daylight scenes. To provide an acceptable image quality, HDR images could be used, which could be generated by stacking two or more RGB images with different exposure times of the alternating sequence shown above. However, since an IR image lies between two RGB images, the captured scene might have changed between the two RGB images so that a stacking would lead to an unsatisfying image quality (e.g., due to motion blurring, ghosting effects, etc.). Since the IR images are typically required for computer vision task, one cannot simply replace them with further RGB images with different exposure times.

Hence, using methods known in the art to obtain both IR images and HDR images would require a capture sequence of three images: IR-RGB with long exposure time-RGB with short exposure time (then RGB image with long exposure time could be merged with the RGB image with short exposure time to obtain an HDR image). However, since three frames are required for this process, the overall frame rate, specifically for the provision of IR images, would be decreased, preventing them for tracking fast eye movements of a vehicle's driver.

Therefore, there is a need to provide a method and apparatus for generating an HDR image from captured images by at the same time providing IR images at a high frame rate.

The background description provided here is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

SUMMARY

Aspects of the present disclosure are set out in the accompanying independent and dependent claims. Combinations of features from the dependent claims may be combined with features of the independent claims as appropriate and not merely as explicitly set out in the claims.

In an aspect, the present invention concerns a computer-implemented method for generating a high dynamic range (HDR) image. The method comprises the steps of obtaining a short exposure color-IR image captured with an activated infrared (IR) illuminator and a long exposure color-IR image captured with a deactivated IR illuminator, wherein the short exposure color-IR image is captured with a shorter exposure time than the long exposure color-IR image. The method further comprises determining an IR light impact of the of the short exposure color-IR image and of the long exposure color-IR image, mitigating the IR light impact in the short exposure color-IR image to obtain a short exposure IR-suppressed color image, mitigating the IR light impact in the long exposure color-IR image to obtain a long exposure IR-suppressed color image, and merging the short exposure IR-suppressed color image with the long exposure IR-suppressed color image to obtain a merged HDR image.

Generating an HDR image as described above benefits from the fact that the short exposure color-IR image, stored in a RAW format, captured with an active IR illumination (e.g., provided by a near infrared (NIR) illuminator or an IR illuminator connected and controlled by the camera used for capturing the images) contains little color information in regions where the active IR illumination is strong. In regions that are very bright in the long exposure color-IR image, stored in a RAW format, captured with an inactive IR illumination (e.g., areas of the image showing the surrounding of a vehicle through one or more windows of the vehicle during daytime with strong sunlight), the corresponding regions in the short exposure color-IR image captured with an active IR illumination have less impact compared to the amount of visible light and ambient IR light in the sun spectrum. Hence, during merging of the two images, the regions in the short exposure color-IR image captured with an active IR illumination that correspond to the bright regions in the long exposure color-IR image captured with an inactive IR illumination may be weighted higher, resulting in a merged HDR image with improved quality compared to a single exposure RGB image. Since the merged HDR image is derived from color-IR images, it is also possible to derive an IR-image from the color-IR images (without or with reduced impact of visible light), which may then be used for computer vision tasks, whereas the merged HDR image may be used for human vision tasks (using the merged HDR image for human vision tasks may require a further processing of the merged HDR image). Generating and HDR image and an IR image in the above described way allows to provide both image type with a higher frame rate compared to prior art methods, which typically rely on an image sequence comprising one IR image and two color images.

In a further aspect, the step of mitigating the IR light impact in the short exposure color-IR image further comprises transforming the short exposure color-IR image into an IR image, and subtracting the IR image from the short exposure color-IR image.

Mitigating the IR light impact in the short exposure color-IR image in the above-described way allows using the IR image for two tasks. As a first task, the IR image may be used for the mitigation of the impact of IR light in the short exposure color-IR image resulting in the short exposure IR-suppressed color image. Second, the IR image may be reused in computer vision tasks (e.g., object detection and/or classification), which typically operate on IR images. Hence, the above-described aspect provides an efficient way for realizing the mitigation since the intermediate result (the IR image) may be further used for other tasks. Furthermore, the short exposure IR-suppressed color image comprises only (or almost only) visible light information, rendering it suitable for merging it with another long exposure IR-suppressed color image to produce a merged HDR image.

In yet a further aspect, the step of mitigating the IR light impact in the short exposure color-IR image further comprises rearranging a color-IR channel configuration of the short exposure color-IR image to match an output of a common color camera.

Rearranging the color-IR channel configuration may replace the original RGB-IR color filter array (CFA) pattern with a CFA pattern of a standard color camera (e.g., RGGB). This may simplify the further processing of the image since a plurality of know (hardware) accelerators for supporting/accelerating image processing are only able to operate on CFA patterns of standard color cameras.

In a further aspect, the steps of subtracting and rearranging are executed in parallel.

Performing the aforementioned steps in parallel may reduce the computational time required for performing the steps, resulting in an improved efficiency.

In a further aspect, the step of mitigating the IR light impact in the long exposure color-IR image further comprises subtracting IR information from the long exposure color-IR image, and during the step of subtracting IR information from the long exposure color-IR image, rearranging a color-IR channel configuration of the long exposure color-IR image to match an output of a common color camera.

Rearranging the color-IR channel configuration may replace the original RGB-IR CFA pattern with a CFA pattern of a standard color camera (e.g., RGGB). This may simplify the further processing of the image since a plurality of know (hardware) accelerators for supporting/accelerating imaging processing are only able to operate on CFA patterns of standard color cameras. Performing both steps in parallel may reduce the computational time required for performing the steps, resulting in an improved efficiency.

In yet a further aspect, the step of merging further comprises merging the short exposure IR-suppressed color image with the long exposure IR-suppressed color image based on a blending factor. The method may further comprise determining the blending factor based on the short exposure IR-suppressed color image and the long exposure IR-suppressed color image; or the short exposure color-IR image and the long exposure color-IR image; or the short exposure IR-suppressed color image, the long exposure IR-suppressed color image, the short exposure color-IR image and the long exposure color-IR image.

Merging based on a blending factor allows to control how strong which parts of each of the two merged images affect to merged HDR image to be generated and thus provides a control mechanism improving the image quality of the merged HDR image, specifically when the image includes overly bright and overly dark regions. Providing different ways for calculating the blending factor may improve flexibility of the method.

In yet a further aspect, the step of merging further comprises determining a brightness of the short exposure IR-suppressed color image and the long exposure IR-suppressed color image, aligning the brightness of the short exposure IR-suppressed color image and the long exposure IR-suppressed color image, performing a white balance adjustment of the short exposure IR-suppressed color image and the long exposure IR-suppressed color image based on the aligned brightness.

Aligning the brightness of the two images in a processing step allows using a standard white balance adjustment algorithm. Performing a white balance adjustment may improve the quality of the HDR image, since, for example, color distortion resulting from a highly saturated pixel may be avoided.

In yet a further aspect, the step of merging further comprises merging the short exposure IR-suppressed color image with the long exposure IR-suppressed color image to obtain the merged HDR image, wherein the short exposure IR-suppressed color image is a predecessor or a successor in time of the long exposure IR-suppressed color image.

Merging the two images in this way may allow outputting an IR image (e.g., usable in computer vision tasks) with the half frame rate supported by the used camera, whereas the generated HDR images may be generated at full frame rate without requiring the imager of the camera to have the capability of embedded HDR merging. In addition, it allows generating the HDR images only at half of the supported frame rate, resulting in a generation process that requires less computational power.

In yet a further aspect, the step of merging comprises merging the short exposure IR-suppressed color image with the long exposure IR-suppressed color image and with a further long exposure IR-suppressed color image to obtain the merged HDR image, wherein the long exposure IR-suppressed color image is a predecessor in time of the short exposure IR-suppressed color image, and wherein the further long exposure IR-suppressed color image is a successor in time of the short exposure IR-suppressed color image.

According to this aspect, the HDR image is generated based on one short exposure IR-suppressed color image and on two long exposure IR-suppressed color images, resulting in a HDR image with a higher dynamic range compared to an HDR image that has been generated based on two images.

In yet a further aspect, the method further comprises obtaining the HDR image by performing at least one of: performing a color reconstruction of the merged HDR image and/or applying an image enhancement algorithm to the merged HDR image, comprising one or more of: tone mapping based on a tone map, lens shading correction, black level correction, image warping/distortion correction, and/or denoising.

By performing a color reconstruction (e.g., demosaicing), the HDR image may be usable for human vision tasks. Applying one or more image enhancement algorithms may further improve image quality.

In yet a further aspect, the method further comprises using the IR image in a computer vision task, comprising one or more of the following: sensing the state of a cabin of a vehicle, determining whether a driver of the vehicle is subject to microsleeping, determining the number of passengers of the vehicle and/or determining a gaze direction of the driver. In addition, the method may comprise using the HDR image in a human vision task, comprising one or more of the following: displaying the HDR image on a display and/or streaming the HDR image to an output unit, a video call unit.

Having both the IR image and a high quality HDR image available, generated at half or full frame rate of the used camera, allows using both image types in different tasks. The IR images are particularly well suited for computer vision tasks, whereas the HDR images are particularly well suited for human vision tasks. Since both image types are provided according to a high frame rate, specifically computer vision tasks operating on IR images, like gaze direction detection, benefit from the disclosed method.

In a further aspect, the present invention relates to a computer-implemented method for generating a high dynamic range (HDR) image for use in an infotainment system. The method comprises generating the HDR image according to the method as disclosed above, and using the HDR image in a human vision task, comprising displaying the HDR image on a display, and/or streaming the HDR image to an output unit, a video call unit.

A further aspect of the present invention relates to an apparatus comprising means configured for performing the method as outlined above.

A further aspect of the present invention relates to a computer program comprising instructions, which when executed by a computer, cause the computer to perform the method as outlined above.

A further aspect of the present invention relates to a vehicle comprising the aforementioned apparatus.

Further areas of applicability of the present disclosure will become apparent from the detailed description, the claims, and the drawings. The detailed description and specific examples are intended for purposes of illustration only and are not intended to limit the scope of the disclosure.

BRIEF DESCRIPTION OF THE DRAWINGS

Various aspects of the present invention are described in more detail in the following by reference to the accompanying figures without the present invention being limited to the embodiments of these figures.

In the drawings, reference numbers may be reused to identify similar and/or identical elements.

DETAILED DESCRIPTION

Figure 1A:
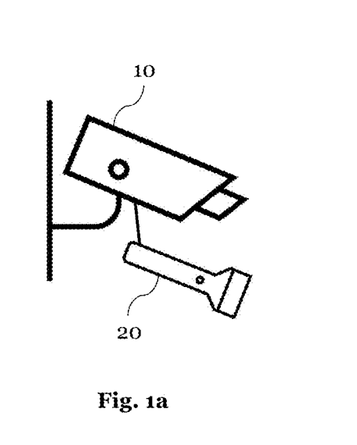
FIG. 1a shows an RGB-IR camera and an inactive NIR illuminator according to aspects of the present invention.
Figure 1B:
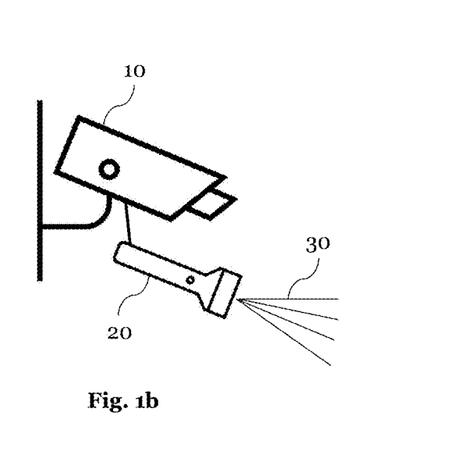
FIG. 1b shows an RGB-IR camera and an active NIR illuminator according to aspects of the present invention.

FIGS. 1a and 1b schematically shows an RGB-IR camera 10 connected to a NIR illuminator 20. The NIR illuminator 20 may also be arranged in the camera 10. The camera 10 may be configured to acquire images, wherein the NIR illuminator 20 may be turned on and off in an alternating way. FIG. 1a depicts a situation in which the NIR illuminator 20 is inactive or deactivated, whereas FIG. 2b depicts a situation in which the NIR illuminator 20 is active or activated, as indicated by the IR light rays 30. An image acquired while the NIR illuminator 20 is active may be a short exposure color-IR image, whereas an image acquired while the NIR illuminator 20 is inactive may be long exposure color-IR image. The short exposure color-IR image may be acquired with an exposure time that is shorter than the exposure time used for acquiring the long exposure color-IR image, as expressed by the terms "long exposure" and "short exposure".

Both the short exposure color-IR image and the long exposure color-IR image are acquired in RAW format (e.g., as RGB-IR CFA images). Both image types are affected by visible and IR light (both types of light are included in ambient light, e.g. sun light). Since the short exposure color-IR image is captured with an active NIR illuminator 20, the range of light captured by the camera 10 includes more infrared light during capturing this image type compared to acquiring a long exposure color-IR image with an inactive NIR illuminator 20.

To produce an HDR image and an IR image, the IR part of the short exposure color-IR image may be extracted (at least up to a certain degree of accuracy) and stored as in IR image, which may then be further used, e.g., in computer vision tasks. The IR image may then be subtracted from the short exposure color-IR image. The resulting image may be stored as a first processed image, having a reduced (or even eliminated) IR light impact. Also from the long exposure color-IR image, the IR light impact may be removed (which is less string compared to the short exposure color-IR image since the long exposure color-IR image has been acquired with the NIR illuminator 20 deactivated) at least to some degree, resulting in a second processed image. Both the first and second processed image may then be merged, and optionally further processed, to obtain an HDR image. The generation of the HDR image and the merging operation will be further explained in detail with respect to FIGS. 2a and 2b.

Figure 2A:
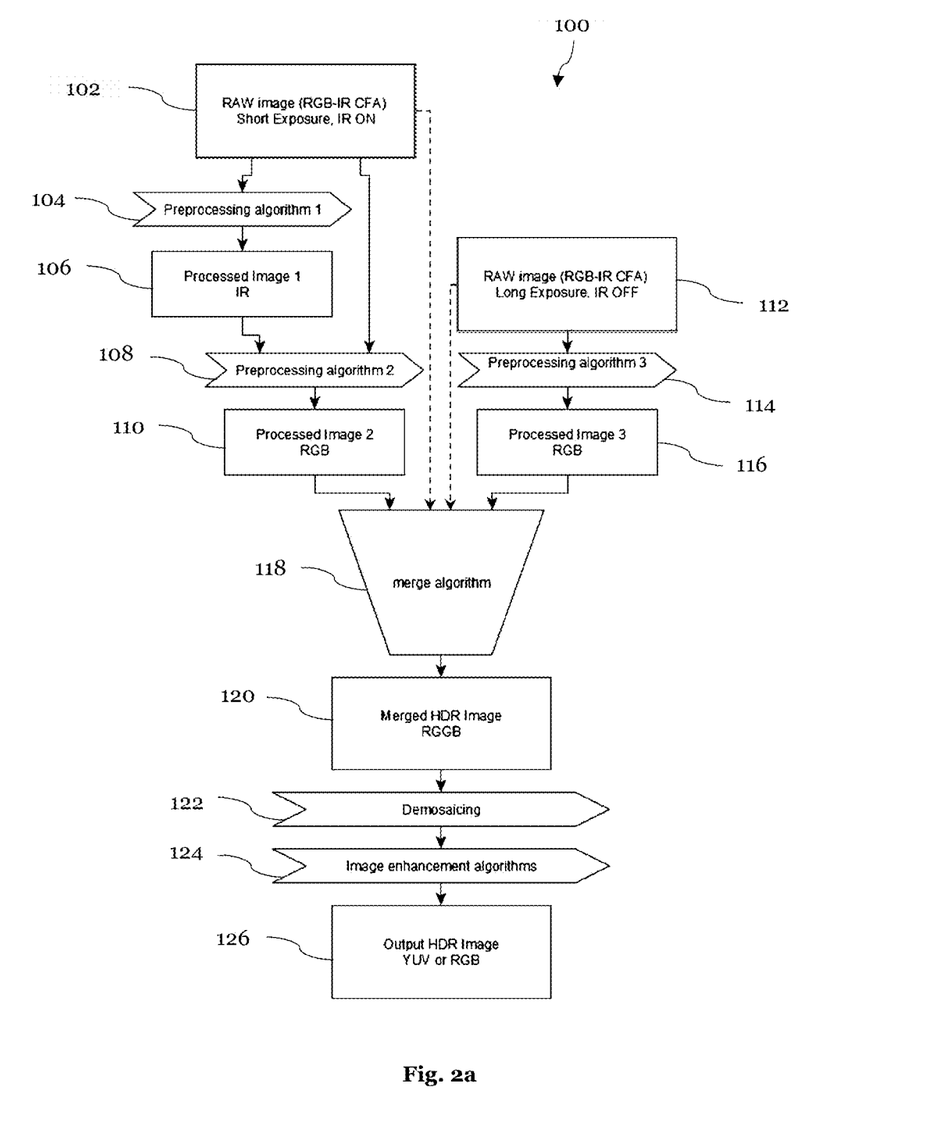
FIG. 2a shows an algorithm to obtain an HDR image according to aspects of the present invention.
Figure 2B:
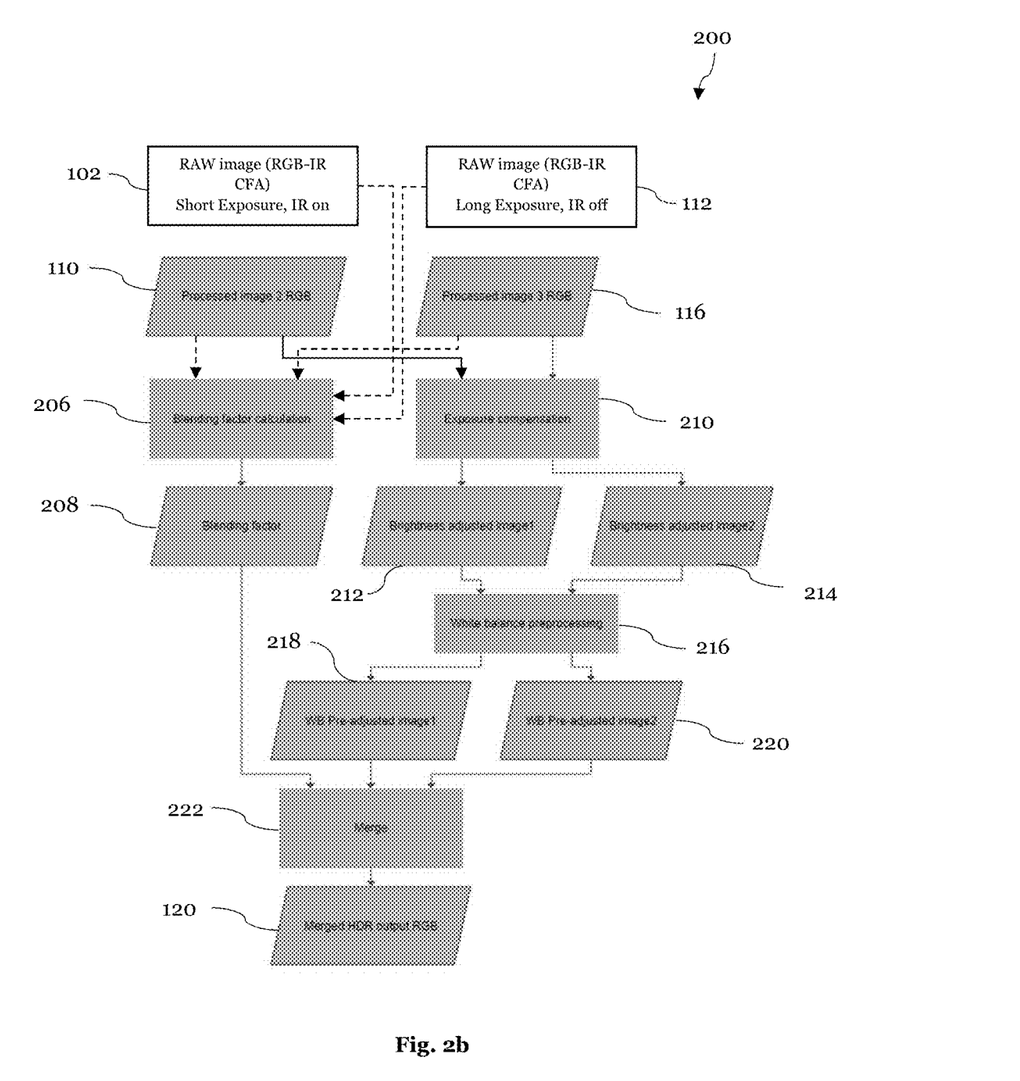
FIG. 2b shows a merge algorithm according to aspects of the present invention.

FIG. 2a depicts an algorithm 100 for generating an HDR image 126. As an input for algorithm 100, two images 102 and 112 are used that have been captured by an RGB-IR camera 10 having a corresponding imager, wherein the visible light pixels of the imager are sensitive to both visible and IR light. Image 102 is a short exposure color-IR image that has been captured with an active IR illumination. The IR illumination may be provided by a NIR illuminator 20, which is active during capturing of image 102. The NIR illuminator 20 may be connected to and controlled by the RGB-IR camera 10. Image 102 is an RGB-IR CFA image in RAW format captured with a short exposure time. Image 112 is a long exposure color-IR image captured with an inactive IR illumination, which means that no NIR illuminator 20 is active during capturing. Image 112 is an RGB-IR CFA image in RAW format captured with a long exposure time. In other words, image 112 is captured with a longer exposure time than image 102. Image 112 maybe captured before or after image 102. However, the time between the two capturing processes is short such that the captured scene is essentially the same in both images 102 and 112.

Capturing the short exposure color-IR image 102 and the long exposure color-IR image 112 could be done with independent automatic exposure times. Alternatively, the short exposure color-IR image 102 cold be captured with an automatic exposure time, whereas the long exposure color-IR image may be captured with an exposure time relative to the automatic exposure time of the short exposure color-IR image. As a third option, the long exposure color-IR image may be captured with an automatic exposure time, whereas the short exposure color-IR image is captured with an exposure time relative to the automatic exposure time of the long exposure color-IR image.

Providing different ways of exposure control may improve flexibility and adaptability of the disclosed method to different scenery conditions, e.g., with respect to varying light conditions in different regions of the captured images. Moreover, it may be controlled which parts of the image (dark or light regions) are to be provided in high quality.

On raw signal level, both images 102 and 112 have the same format and CFA pattern. However, due to the difference in ambient illumination (with and without active IR illumination) and exposure time, the images capture different parts of the dynamic range of a scene. Image 102, captured with active IR illumination, still contains some color information in the color pixels.

In step 104, a first preprocessing algorithm is executed. The first preprocessing algorithm processes image 102 to obtain an IR image 106, in full resolution, suitable for computer vision tasks. Hence, the first preprocessing algorithm according to step 104 is configured to only output the IR part of the light spectrum captured in image 102 and thus removes the impact of visible light from image 102. An example implementation of the first preprocessing algorithm may upscale the IR channel of image 102 to full resolution and use the visible light pixels to steer the amount of averaging to keep the edges in the image 102 sharp (e.g., by using bilateral filtering).

Both image 102 and IR image 106 are further processed by a second preprocessing algorithm 108 to obtain a short exposure IR-suppressed color image 110. Image 110 is a full resolution RGGB color image in RAW format that only comprises the visible part of the light spectrum, which is achieved by removing the impact of invisible IR light. The second preprocessing algorithm maybe implemented in two different ways.

In a first instance, the second preprocessing algorithm 108 is a combination of subtracting the IR image 106 or its content from image 102 and of applying a remosaicing algorithm that rearranges the native RGB-IR channel configuration from the imager's CFA to a pattern that matches the output of a common RGB camera 10. Such pattern may be beneficial for further processing using a hardware accelerated demosaicing function that could not work with IR pixels in the CFA (the remosaicing may be skipped if an RGB-IR pattern is directly supported by the demosaicing step 122). In a second instance, the second preprocessing algorithm 108 may subtract IR image 106 or its content from image 102 and may perform the remosaicing after the subtraction (the remosaicing step may be skipped if an RGB-IR pattern is directly supported by the demosaicing step 122). Both instances of the second preprocessing algorithm 108 may comprise correction routines for handling saturated pixels.

Image 112 is processed by a third processing algorithm according to step 114 to obtain a long exposure IR-suppressed color image 116. The third processing algorithm 114 removes the contribution of IR light from the visible light pixels and applies a remosaicing, as described with respect to the second preprocessing algorithm according to step 108. Again, the remosaicing step may be skipped according to the conditions as outlined with respect to the second preprocessing algorithm 108. The remosaicing step may be configured differently compared to step 108 to take into account the absence of active IR illumination. To perform the preprocessing algorithm 114, methods known in the art may be used. For the further processing of images 110 and 116, however, it has to be ensured that both images 110 and 116 are based on the same RAW color image pattern.

In step 118, images 110 and 116 are merged to obtain a merged HDR image 120, in RGGB RAW format. The step of merging will be described in more detail with respect to FIGS. 2 to 5. The merging algorithm 118 takes into account the fact that image 102 contains little color information in regions where active IR illumination is strong, while in regions that are very bright in image 112 (e.g., for a vehicle cabin scene if looking outside the windows at sunlight), image 102 is weighted much higher in merging step 118 since the active IR part is much less impactful compared to the amount of IR light in the sun spectrum. The weighting may computed as a function of the ratio of visible light and IR light in the local neighborhood of a given pixel position.

Optionally, as indicated by the dashed arrows in FIG. 2a that connect images 102 and 112 with step 118, images 102 and 112 may also be passed to merging algorithm 118, which may further improve the image quality of the resulting HDR image 126 and/or may reduce the required computation time.

In step 122, demosaicing is applied to the merged HDR image 120 to reconstruct a full color image from the incomplete color samples output from the imager (image sensor) of the used camera 10 overlaid with a CFA. In addition, optionally, one or more image enhancement algorithms may be applied in step 124, comprising one or more of tone mapping based on a tone map, lens shading correction, black level correction, image warping/distortion correction and/or denoising. Both steps are executed by an image signal processor (ISP).

Using algorithm 100 enables providing an IR image 106, which may be a full resolution monochrome IR image, usable for computer vision tasks by at the same time providing an HDR image 126, usable for human vision tasks.

FIG. 2b depicts an algorithm 200 for merging images 110 and 116 that may be applied in step 118 of algorithm 100. In step 206, a blending factor calculation is performed based either on images 110 and 116 or based on images 102 and 112. Optionally, all four images 102, 112, 110 and 116 may be used for the blending factor calculation. In step 206, a blending factor 208 may be calculated based on the luma component of image 116 and the amount of remaining signal in image 110 after IR light component mitigation/suppression. In addition or alternatively, images 102 and image 112 may be used to conduct this step. Using only images 102 and 112 may improve the performance of the blending factor calculation.

Using images 102 and 112 (in addition or alternatively) for the blending factor calculation may result in an improved blending factor computation, specifically in use cases where the images reflect the inside of a vehicle cabin. In such a case, the short exposure color-IR image 102 may favor outside pixels (e.g., pixels referring to regions visible through a vehicle window), while it the long exposure color-IR image 112 may favor the inside of the cabin. This allows detecting outside pixels (high ambient light pixels) based on the amount of IR light in native IR pixels. This may result in higher values for pixels that are illuminated from the active illumination (IR or NIR illumination; typically close to camera). These pixels are likely inside the cabin accordingly.

Benefits in image quality may comprise fewer ghosting effects (double edges in case of mixing long and short exposure images 102 and 112 from different capture times). If all pixels inside a window region are coming from one frame, they are all typically captured from the same time step and thus do not show the double edges.

In step 210, an exposure compensation is performed based on both images 110 and 116. In this step, the brightness of the images 110 and 116 is adjusted to be at the same level. This may help to have a seamless output, resulting in two brightness-adjusted images 212 and 214 based on images 110 and 116, respectively.

In step 216, a white balance preprocessing is performed based on the brightness-adjusted images 212 and 214. Since the brightness of the two images 212 and 214 has already been aligned in step 210, a standard white balancing algorithm may be used in step 216. As an output, step 216 produces two white-balanced pre-adjusted images 218 and 220 based on images 110 and 116, respectively. The reason for performing a white balance preprocessing is that the color of the pixels with high luma values may be distorted, because of the saturation in one channel. Typically, the green color channel gets saturated at first (other channels can also saturate, but are typically less sensitive). Without adjusting the green channel bright pixels will become pinkish after white balance correction. Hence, the corresponding pixels are eliminated in step 216.

In step 222, the two white-balanced pre-adjusted images 218 and 220 are merged according to the blending factor 208 to generate the merged HDR image 120, in terms of an RGGB image, which may then be further processed according to steps 122 and 124 as depicted in FIG. 2a according to algorithm 100 to generate the HDR image 126.

Figure 3:
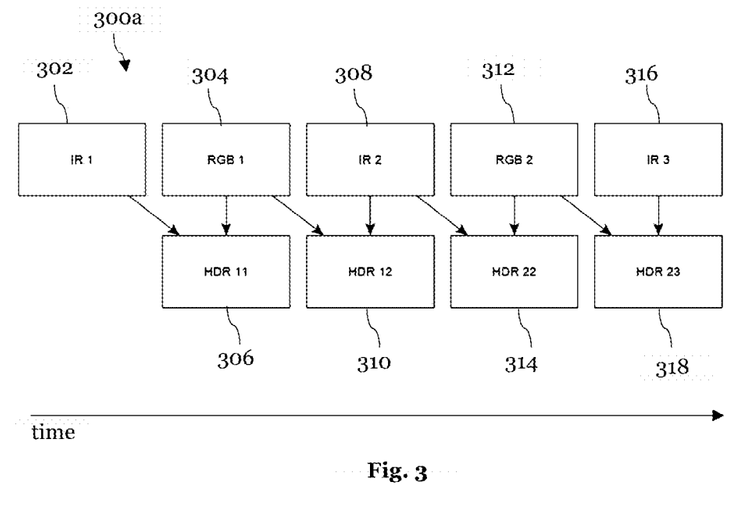
FIG. 3 shows a first image merging sequence according to aspects of the present invention.
Figure 4:
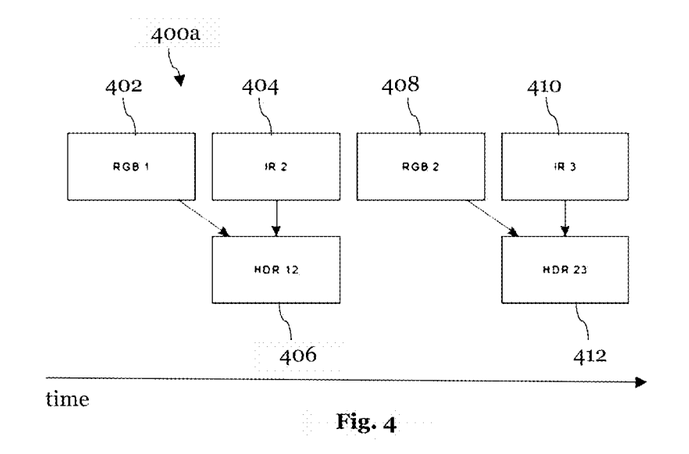
FIG. 4 shows a second image merging sequence according to aspects of the present invention.
Figure 5:
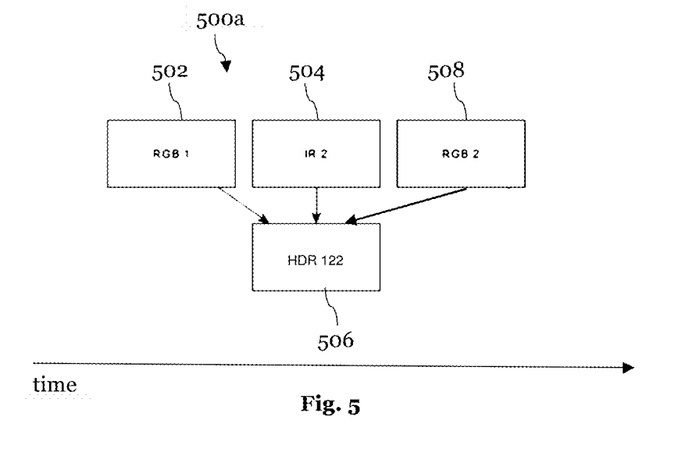
FIG. 5 shows a third image merging sequence according to aspects of the present invention.

Example merging sequences that may be applied in step 222 of algorithm 200 are depicted in FIGS. 3 to 5.

FIG. 3 depicts a first example merging sequence 300. A short exposure IR-suppressed color image 302, which corresponds to short exposure IR-suppressed color image 110 according to algorithm 100, is merged with a long exposure IR-suppressed color image 304, which corresponds to long exposure IR-suppressed color image 116 according to algorithm 100, to obtain and HDR image 306, which corresponds to HDR image 126 according to algorithm 100. In this example, image 302 is derived from a short exposure color-IR image 102 (see FIG. 2a), whereas image 304 is derived from a long exposure color-IR image 112 (see FIG. 2a), wherein short exposure color-IR image 102 has been captured before the long exposure color-IR image 112, as indicated by the time axis according to the black arrow. Both images 102 and 112 were taken at short time intervals, so that the scenery shown in both images has not changed or has changed only slightly.

After having generated HDR image 306, a further HDR image 310 may be obtained by merging image 304 with image 308. Image 308 is a short exposure IR-suppressed color image, which corresponds to short exposure IR-suppressed color image 110 according to algorithm 100, whereas image 304, as outlined above, is a long exposure IR-suppressed color image, which corresponds to long exposure IR-suppressed color image 116 according to algorithm 100. Image 308 is derived from a short exposure color-IR image 102 (see FIG. 2a), whereas image 304 is derived from a long exposure color-IR image 112 (see FIG. 2a), wherein short exposure color-IR image 102 has been captured after the long exposure color-IR image 112, as indicated by the time axis according to the black arrow. Both images 102 and 112 were taken at short time intervals, so that the scenery shown in both images has not changed or has changed only slightly. In a similar way, HDR images 314 and 318 are generated by merging images 308, 312 and 316.

Using this merging approach allows outputting HDR images 126 at full frame rate. Assuming that the used camera 10 supports a frame rate of 60 frames per second, 60 HDR images 126 could be generated per second. At the same time, 30 IR images 106 may be produce per second, since IR images can only be derived from short exposure color-IR images 102. This is because only short exposure color-IR images 102 have been captured with active IR illumination.

FIG. 4 depicts a second example merging sequence 400. A short exposure IR-suppressed color image 404, which corresponds to short exposure IR-suppressed color image 110 according to algorithm 100, is merged with a long exposure IR-suppressed color image 402, which corresponds to long exposure IR-suppressed color image 116 according to algorithm 100, to obtain and HDR image 406, which corresponds to HDR image 126 according to algorithm 100. In this example, image 404 is derived from a short exposure color-IR image 102 (see FIG. 2a), whereas image 402 is derived from a long exposure color-IR image 112 (see FIG. 2a), wherein short exposure color-IR image 102 has been captured after the long exposure color-IR image 112, as indicated by the time axis according to the black arrow. Both images 102 and 112 were taken at short time intervals, so that the scenery shown in both images has not changed or has changed only slightly.

After having generated HDR image 406, a further HDR image 412 may be obtained by merging image 410 with image 408. Image 410 is a short exposure IR-suppressed color image, which corresponds to short exposure IR-suppressed color image 110 according to algorithm 100, whereas image 408 is a long exposure IR-suppressed color image, which corresponds to long exposure IR-suppressed color image 116 according to algorithm 100. Image 410 is derived from a short exposure color-IR image 102 (see FIG. 2a), whereas image 408 is derived from a long exposure color-IR image 112 (see FIG. 2a), wherein short exposure color-IR image 102 has been captured after the long exposure color-IR image 112, as indicated by the time axis according to the black arrow. Both images 102 and 112 were taken at short time intervals, so that the scenery shown in both images has not changed or has changed only slightly.

Using this merging approach allows outputting HDR images 126 at half frame rate. Assuming that the used camera 10 supports a frame rate of 60 frames per second, 30 HDR images 126 could be generated per second. Identical to the first merging sequence 300, 30 IR images 106 may be produced per second. Compared to the first merging sequence 300, merging sequence 400 comprises a lower number of merging operations, resulting in less computational power required for performing the merging sequence 400 compared to merging sequence 300.

FIG. 5 depicts a third example merging sequence 500. A short exposure IR-suppressed color image 504, which corresponds to short exposure IR-suppressed color image 110 according to algorithm 100, is merged with a long exposure IR-suppressed color image 502, which corresponds to long exposure IR-suppressed color image 116 according to algorithm 100 and with a further long exposure IR-suppressed color image 508, to obtain and HDR image 406, which corresponds to HDR image 126 according to algorithm 100. In this example, image 504 is derived from a short exposure color-IR image 102 (see FIG. 2a), whereas images 502 and 508 are derived from first and second long exposure color-IR images 112 (see FIG. 2a), wherein short exposure color-IR image 102 has been captured after the first long exposure color-IR image 112 and before the second long exposure color-IR image 112, as indicated by the time axis according to the black arrow. All three images 102 and 112 were taken at short time intervals, so that the scenery shown in the images has not changed or has changed only slightly.

Using this merging approach based on three images allows capturing first and second long exposure color-IR images 112 with different exposure times, which may result in a higher dynamic range in HDR image 506.

Figure 6A:
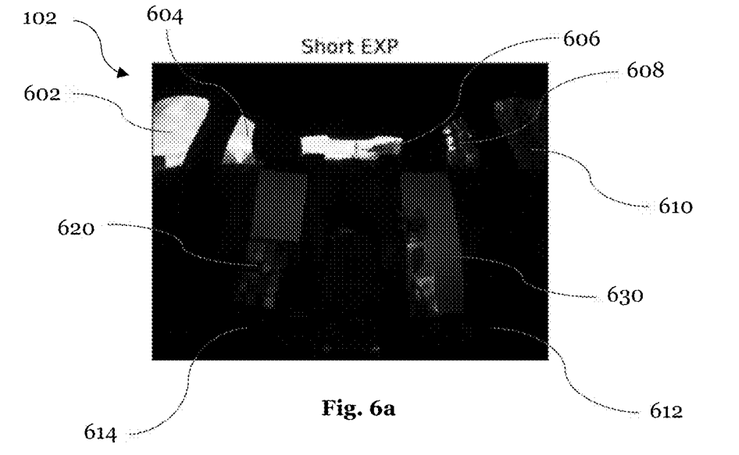
FIG. 6a shows a short exposure image with an active IR illumination according to aspects of the present invention.

FIG. 6a depicts a short exposure color-IR image 102 showing the cabin of a car. Image 102 shows a right front side window 602, a right rear side window, 604, a rear window 606, a left rear side window 608, a left front side window 610, a driver seat 612 and a passenger seat 614. In addition, image 102 shows two color test patterns 620 and 630.

Figure 6B:
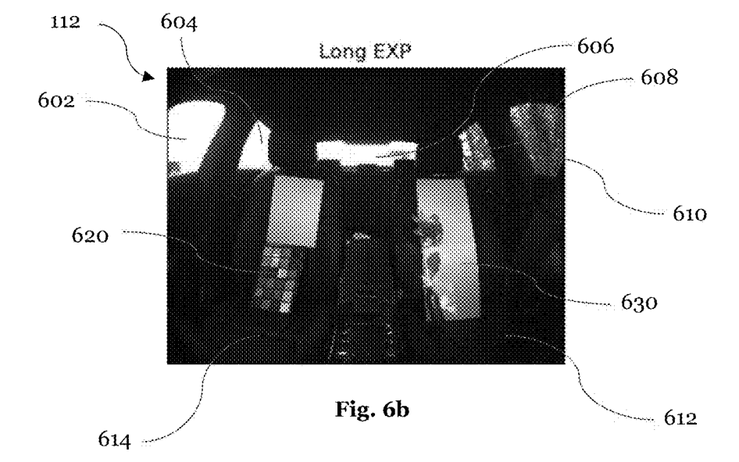
FIG. 6b shows a long exposure image with an inactive IR illumination according to aspects of the present invention.

FIG. 6b depicts a long exposure color-IR image 112 showing the same cabin of a car as depicted in FIG. 6a. Hence, image 112 shows the right front side window 602, the right rear side window, 604, the rear window 606, the left rear side window 608, the left front side window 610, the driver seat 612 and the passenger seat 614. In addition, image 112 shows the two color test patterns 620 and 630.

Since image 102 according to FIG. 6a has been captured with active IR illumination, the outside scenery with a large light intensity (due to sunlight) surrounding the car is shown with more details compared to FIG. 6b, as can be seen in windows 602, 604 and 606 of FIG. 6a, whereas the outside scenery with less sunlight impact is shown with less details, as can be seen in windows 608 and 610 of FIG. 6a. In contrast, since image 112 has been captured with an inactive IR illumination and with a higher exposure time than image 102, the outside scenery with less sunlight impact is shown with more details, as can be seen in windows 608 and 610 of FIG. 6b, whereas the scenery with a larger sunlight impact is shown with less details, as can be seen in windows 602, 604 and 606 (the corresponding pixels are saturated).

In addition, the image 112 according to FIG. 6b, the two color test patterns 620 and 630 are shown with more color details compared to image 102 according to FIG. 6a, due to the longer exposure time.

Figure 7:
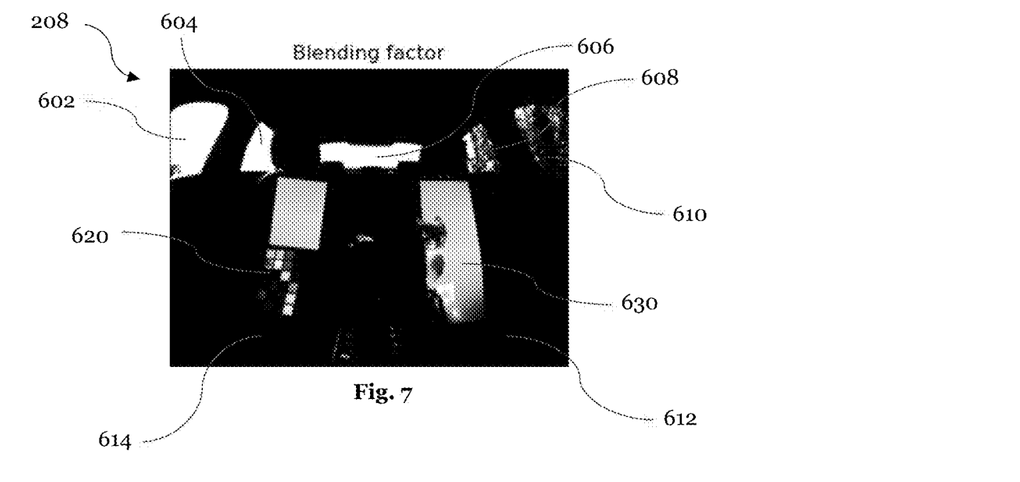
FIG. 7 shows a blending factor according to aspects of the present invention.

FIG. 7 depicts a blending factor 208, which may be determined in step 206 of algorithm 200 and used for merging images 218 and 220 in step 222 of algorithm 200. The brighter a pixel is in the blending factor 208, the higher the corresponding pixel in the short exposure IR-suppressed color image 110 is weighted during merging. Likewise, the darker a pixel is in the blending factor 208, the higher the corresponding pixel in the long exposure IR-suppressed color image 116 is weighted during merging.

Figure 8:
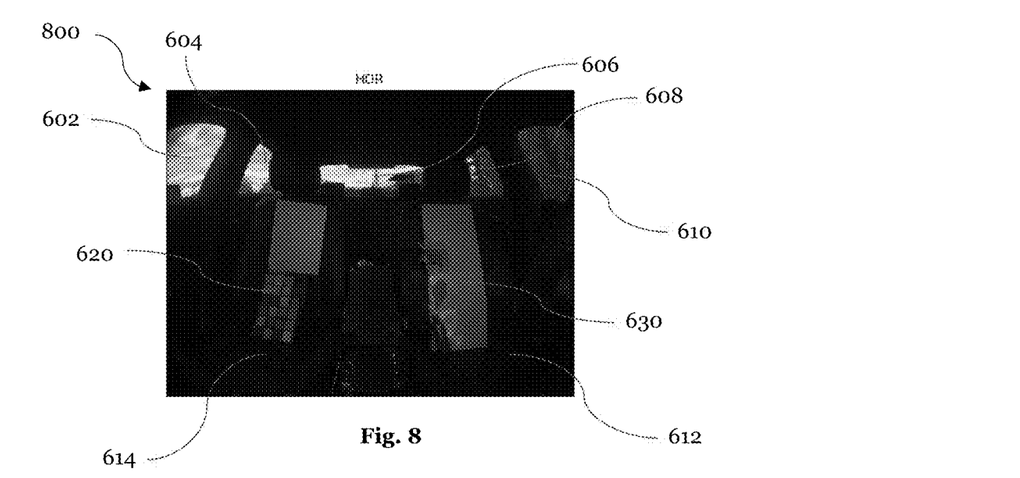
FIG. 8 shows an HDR image according to aspects of the present invention.

FIG. 8 depicts a merged HDR image 800 which may result from merging algorithm 200 and wherein a demosaicing according to step 122 has already been applied.

Figure 9:
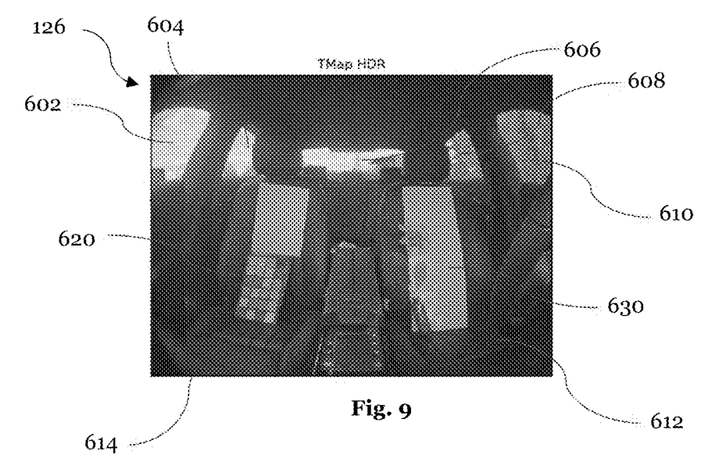
FIG. 9 shows a tone-mapped HDR image according to aspects of the present invention.

FIG. 9 depicts an HDR image 126 that has been processed by image enhancement algorithms 124. In this example, specifically a tone mapping has been conducted, where in the range of tones has been remapped as well as a color tuning and/or a color calibration. As can be seen from FIG. 9, HDR image 126 shows details in all side windows 602, 604, 608, and 610. The same is true for rear window 606. In addition, also details of the seats 612 and 614 are visible. As can be seen from the color test patterns 620 and 630, HDR image 126 also comprises more color details compared to images 102 and 112.

This makes HDR image 126 particularly suitable for being displayed on display for human vision tasks as well as for being used in video calls. For example, a video call unit may receive the HDR images as input. In addition, an HDR image could be used as a selfie that could be posted in a social media network.

By contrast, IR image 106 may be used in computer vision tasks that typically operate on infrared images. Example tasks are sensing the state of a cabin of a vehicle, determining whether a driver of the vehicle is subject to microsleeping (if microsleeping is detected, a visual, audio-visual or audio-based alert could be issued), determining the number of passengers of the vehicle and determining a gaze direction of the driver. A further example comprises reducing the risk of accidents by detecting drowsiness of the driver and alerting the driver before it comes to microsleeping.

The disclosed method can be configured in different variants of exposure settings for short and long exposure images. It does not require a fixed ratio of exposures, nor does the merge algorithm 200 require the knowledge of the exposure time of the input images. However, if the exposure times are known, this information can be used for brightness adjustment.

Variant A: Short exposure color-IR image 102 captured with an active IR illumination is captured with an independent auto exposure setting, e.g., to optimize the image 102 for driver state sensing tasks with good visibility of the driver's faces. Long exposure color-IR image 112 captured with an inactive IR illumination is captured with an auto exposure setting, e.g., configured to obtain good color images of the cabin inside, accepting that windows can saturate.

Variant B: Short exposure color-IR image 102 captured with an active IR illumination is captured with an independent auto exposure setting, e.g., to optimize the image 102 for driver state sensing tasks with good visibility of the driver's faces. Long exposure color-IR image 112 captured with an inactive IR illumination is captured with an exposure setting relative to image 102, e.g., using a configurable fixed ratio.

Variant C: Long exposure color-IR image 112 captured with an inactive IR illumination may be captured with an auto exposure setting, e.g., configured to obtain good color images of the cabin inside, accepting that windows can saturate. Short exposure color-IR image 102 captured with an active IR illumination may be captured with an exposure setting relative the auto exposure setting of image 112, e.g., using a configurable fixed ratio.

Variant D: Image statistics from merged images are considered for auto an exposure control algorithm, wherein long exposure color-IR image 112 captured with an active IR illumination and short exposure color-IR image 112 captured with an inactive IR illumination are derived from the statistics.

The disclosed method may not only be used in cameras 10 for sensing cabins of vehicles, but also in surveillance cameras 10 or other camera types.

Embodiments of the present disclosure may be realized in any of various forms. For example, in some embodiments, the present invention may be realized as a computer-implemented method, a computer-readable memory medium, or a computer system.

In some embodiments, a non-transitory computer-readable memory medium may be configured so that it stores program instructions and/or data, where the program instructions, if executed by a computer system, cause the computer system to perform a method, e.g., any of the method embodiments described herein, or, any combination of the method embodiments described herein, or, any subset of any of the method embodiments described herein, or, any combination of such subsets.

In some embodiments, a computing device may be configured to include a processor (or a set of processors) and a memory medium, where the memory medium stores program instructions, where the processor is configured to read and execute the program instructions from the memory medium, where the program instructions are executable to implement any of the various method embodiments described herein (or, any combination of the method embodiments described herein, or, any subset of any of the method embodiments described herein, or, any combination of such subsets). The device may be realized in any of various forms.

Although specific embodiments have been described above, these embodiments are not intended to limit the scope of the present disclosure, even where only a single embodiment is described with respect to a particular feature. Examples of features provided in the disclosure are intended to be illustrative rather than restrictive unless stated otherwise. The above description is intended to cover such alternatives, modifications, and equivalents as would be apparent to a person skilled in the art having the benefit of this disclosure.

The scope of the present disclosure includes any feature or combination of features disclosed herein (either explicitly or implicitly), or any generalization thereof, whether or not it mitigates any or all of the problems addressed herein. In particular, with reference to the appended claims, features from dependent claims may be combined with those of the independent claims and features from respective independent claims may be combined in any appropriate manner and not merely in the specific combinations enumerated in the appended claims.

The term non-transitory computer-readable medium does not encompass transitory electrical or electromagnetic signals propagating through a medium (such as on a carrier wave). Non-limiting examples of a non-transitory computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The term "set" generally means a grouping of one or more elements. The elements of a set do not necessarily need to have any characteristics in common or otherwise belong together. The phrase "at least one of A, B, and C" should be construed to mean a logical (A OR B OR C), using a non-exclusive logical OR, and should not be construed to mean "at least one of A, at least one of B, and at least one of C." The phrase "at least one of A, B, or C" should be construed to mean a logical (A OR B OR C), using a non-exclusive logical OR.

The invention claimed is:

1. A computer-implemented method for generating a high dynamic range (HDR) image, the method comprising:
    obtaining a short exposure color-infrared (color-IR) image captured with an activated infrared (IR) illuminator and a long exposure color-IR image captured with a deactivated IR illuminator, wherein the short exposure color-IR image is captured with a shorter exposure time than the long exposure color-IR image;
    determining an IR light impact of the of the short exposure color-IR image and of the long exposure color-IR image;
    mitigating the IR light impact in the short exposure color-IR image to obtain a short exposure IR-suppressed color image;
    mitigating the IR light impact in the long exposure color-IR image to obtain a long exposure IR-suppressed color image; and
    merging the short exposure IR-suppressed color image with the long exposure IR-suppressed color image to obtain a merged HDR image.

2. The computer-implemented method of claim 1 wherein mitigating the IR light impact in the short exposure color-IR image further includes:
    transforming the short exposure color-IR image into an IR image, and
    subtracting the IR image from the short exposure color-IR image.

3. The computer-implemented method of claim 2 wherein mitigating the IR light impact in the short exposure color-IR image further includes:
    rearranging a color-IR channel configuration of the short exposure color-IR image to match an output of a common color camera.

4. The computer-implemented method of claim 3 wherein subtracting and rearranging are executed in parallel.

5. The computer-implemented method of claim 1 wherein mitigating the IR light impact in the long exposure color-IR image further includes:
    subtracting IR information from the long exposure color-IR image.

6. The computer-implemented method of claim 5 wherein mitigating the IR light impact in the long exposure color-IR image further includes:
    during subtracting IR information from the long exposure color-IR image, rearranging a color-IR channel configuration of the long exposure color-IR image to match an output of a common color camera.

7. The computer-implemented method of claim 1 wherein merging further includes:
    merging the short exposure IR-suppressed color image with the long exposure IR-suppressed color image based on a blending factor.

8. The computer-implemented method of claim 7 wherein the method further includes determining the blending factor based on:
the short exposure IR-suppressed color image and the long exposure IR-suppressed color image,
the short exposure color-IR image and the long exposure color-IR image, or
the short exposure IR-suppressed color image, the long exposure IR-suppressed color image, the short exposure color-IR image and the long exposure color-IR image.

9. The computer-implemented method of claim 1 wherein merging further includes:
determining a brightness of the short exposure IR-suppressed color image and the long exposure IR-suppressed color image;
aligning the brightness of the short exposure IR-suppressed color image and the long exposure IR-suppressed color image; and
performing a white balance adjustment of the short exposure IR-suppressed color image and the long exposure IR-suppressed color image based on the aligned brightness.

10. The computer-implemented method of claim 1 wherein merging further includes:
merging the short exposure IR-suppressed color image with the long exposure IR-suppressed color image to obtain the merged HDR image, wherein the short exposure IR-suppressed color image is a predecessor or a successor in time of the long exposure IR-suppressed color image.

11. The computer-implemented method of claim 1 wherein:
merging includes merging the short exposure IR-suppressed color image with the long exposure IR-suppressed color image and with a further long exposure IR-suppressed color image to obtain the merged HDR image;
the long exposure IR-suppressed color image is a predecessor in time of the short exposure IR-suppressed color image; and
the further long exposure IR-suppressed color image is a successor in time of the short exposure IR-suppressed color image.

12. The computer-implemented method of claim 1 further comprising:
obtaining the HDR image by performing at least one of:
performing a color reconstruction of the merged HDR image, or
applying an image enhancement algorithm to the merged HDR image.

13. The computer-implemented method of claim 12 wherein the image enhancement algorithm to the merged HDR image includes at least one of:
tone mapping based on a tone map;
lens shading correction;
black level correction;
image warping/distortion correction; or
denoising.

14. The computer-implemented method of claim 2 the method further comprising:
using the IR image in a computer vision task including:
sensing a state of a cabin of a vehicle;
determining whether a driver of the vehicle is subject to microsleeping;
determining a number of passengers of the vehicle; and
determining a gaze direction of the driver; and/or
using the HDR image in a human vision task including:
displaying the HDR image on a display; and/or
streaming the HDR image to an output unit.

15. A computer-implemented method for generating a high dynamic range (HDR) image for use in an infotainment system, the method comprising:
generating the HDR image according to the method of claim 1; and
using the HDR image in a human vision task including displaying the HDR image on a display and/or streaming the HDR image to an output unit.

16. An apparatus comprising:
memory configured to store instructions; and
at least one processor configured to execute the instructions, wherein the instructions include:
obtaining a short exposure color-infrared (color-IR) image captured with an activated infrared (IR) illuminator and a long exposure color-IR image captured with a deactivated IR illuminator, wherein the short exposure color-IR image is captured with a shorter exposure time than the long exposure color-IR image;
determining an IR light impact of the of the short exposure color-IR image and of the long exposure color-IR image;
mitigating the IR light impact in the short exposure color-IR image to obtain a short exposure IR-suppressed color image;
mitigating the IR light impact in the long exposure color-IR image to obtain a long exposure IR-suppressed color image; and
merging the short exposure IR-suppressed color image with the long exposure IR-suppressed color image to obtain a merged HDR image.

17. A vehicle comprising the apparatus of claim 16.

18. A non-transitory computer-readable medium comprising instructions including:
obtaining a short exposure color-infrared (color-IR) image captured with an activated infrared (IR) illuminator and a long exposure color-IR image captured with a deactivated IR illuminator, wherein the short exposure color-IR image is captured with a shorter exposure time than the long exposure color-IR image;
determining an IR light impact of the of the short exposure color-IR image and of the long exposure color-IR image;
mitigating the IR light impact in the short exposure color-IR image to obtain a short exposure IR-suppressed color image;
mitigating the IR light impact in the long exposure color-IR image to obtain a long exposure IR-suppressed color image; and
merging the short exposure IR-suppressed color image with the long exposure IR-suppressed color image to obtain a merged HDR image.

\* \* \* \* \*